US012680627B1

(12) United States Patent
Lebron

(10) Patent No.: US 12,680,627 B1
(45) Date of Patent: Jul. 14, 2026

(54) ERY TUBE SUPPORT SYSTEM AND METHOD

(71) Applicant: Ruben Lebron, Ciales, PR (US)

(72) Inventor: Ruben Lebron, Ciales, PR (US)

( * ) Notice: Subject to any disclaimer, the term of this patent is extended or adjusted under 35 U.S.C. 154(b) by 0 days.

(21) Appl. No.: 18/800,264

(22) Filed: Aug. 12, 2024

Related U.S. Application Data

(60) Provisional application No. 63/532,761, filed on Aug. 15, 2023.

(51) Int. Cl.
| | | |
|---|---|---|
| *F16L 3/00* | (2006.01) | |
| *F16L 3/20* | (2006.01) | |
| *F16L 3/10* | (2006.01) | |

(52) U.S. Cl.
CPC .. *F16L 3/20* (2013.01); *F16L 3/10* (2013.01)

(58) Field of Classification Search
None
See application file for complete search history.

(56) References Cited

U.S. PATENT DOCUMENTS

| | | | | |
|---|---|---|---|---|
| 5,155,945 | A * | 10/1992 | Tyler | B24D 13/04 51/298 |
| 5,615,850 | A * | 4/1997 | Cloninger | F16L 3/22 248/68.1 |
| 5,765,786 | A * | 6/1998 | Gretz | H02G 3/26 248/68.1 |
| 6,170,784 | B1 * | 1/2001 | MacDonald | H05K 7/1448 248/65 |
| 10,141,729 | B2 * | 11/2018 | Schaefer | H01B 7/40 |
| 12,247,684 | B2 * | 3/2025 | Neal | F16L 3/01 |
| 2012/0325983 | A1 * | 12/2012 | Vrame | F16L 3/223 248/68.1 |
| 2017/0204996 | A1 * | 7/2017 | Breda | H02G 3/32 |

FOREIGN PATENT DOCUMENTS

| | | | | |
|---|---|---|---|---|
| KR | 200454093 | Y1 * | 6/2011 | F16B 2/22 |

* cited by examiner

*Primary Examiner* — Steven M Marsh
(74) *Attorney, Agent, or Firm* — Luis Figarella

(57) ABSTRACT
A tank pipe support system and method comprises an adjustable height apparatus capable of being tailored to the installed height of a pipe and secured to nearby structural elements, so that the pipe does not place torsional moments on the tank. Of particular notice is the ability of the apparatus to be placed on pipes already connected to tanks and households.

12 Claims, 3 Drawing Sheets

200

214

210

204

208

212

202

302

ERY TUBE SUPPORT SYSTEM AND METHOD

CROSS-REFERENCE TO RELATED APPLICATIONS

This application claims priority to U.S. Provisional patent application Ser. No. 63/532,761 titled "ERY Support Tube", filed on Aug. 15, 2023 the disclosure of which is herein incorporated by reference in its entirety.

PATENTS CITED

The following documents and references are incorporated by reference in their entirety, Brooks (U.S. Pat. Pub. No. 2009/0194473), Leonard (U.S. Pat. No. 9,868,042) and Phillips (U.S. Pat. No. 11,280,430).

FIELD OF THE INVENTION

The invention relates to the technical field of pipe installation and support and particularly relates to supporting pipes connected to plastic cisterns and/or vertical storage tanks.

DESCRIPTION OF THE RELATED ART

In many countries, the availability of water to a household cannot be guaranteed. While this may be solved by the construction of an in-ground cistern, solving the problem for an already built house is complicated.

A common solution, particularly in already existing cement structures, is the installation of a lightweight (typically plastic or composite) cistern or tank on top of the roof. This tank is usually gravity or pump fed (with a float type valve to keep it topped off), then connected to the household's highest feed pipe, so that the water pressure is maintained throughout the structure through a gravity fee. Thus, when any faucet inside the house is used, the cistern water level goes down, and when it goes low enough, it gets refilled by the normal house pressure or pump. When city water fails, the household is left with the water within the cistern.

Unfortunately, the 'ad hoc' quality of the installation, means that the cistern tubes or pipes must adjust to the existing plumbing of the house, usually resulting (Prior Art 100) in 'temporary' pipe connections and securing of the entry 104 and exit pipe 108, that result in cracks around the exit pipe interface with the tank 102. In many cases, an ad hoc solution of stacked rocks 106 results. What is required, is an easy to install exit pipe support that is easy to install and secure to the pipe and the tank site.

SUMMARY OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e., that it will be taken to mean an inclusion of not only the listed components it directly references, but also other non-specified components or elements. This rationale will also be used when the term 'comprised' or 'comprising' is used in relation to one or more steps in a method or process.

In one aspect, the invention is about an adjustable height pipe support apparatus comprising a body having an elongated portion forming a column with a base at a distal end, wherein said base is slightly wider than said elongated portion and said elongated portion is comprised of two or more pipe holding modules, each said pipe holding module comprising, a pipe hosting opening of a determined radius and one notch along each side of each said pipe holding module, said notch located at the center of each said opening. In another aspect, each said opening is the same size and said base has mechanical component attachment openings. In yet another aspect, each said opening is the shape of one of: circle, oval, rectangle, square, and one hook or loop on each side of each said module.

In another aspect, the invention is about an adjustable height pipe support system comprising a body having an elongated portion forming a column with a base at a distal end, wherein said base is slightly wider than said elongated portion and said elongated portion is comprised of two or more pipe holding modules, each said pipe holding module comprising: a pipe hosting opening of a determined radius and one notch along each side of each said pipe holding module, said notch located at the center of each said opening.

In another aspect, the invention is about an adjustable height pipe support method comprising: providing an apparatus with a body having an elongated portion forming a column with a base at a distal end, wherein said base is slightly wider than said elongated portion and said elongated portion is comprised of two or more pipe holding modules, each said pipe holding module comprising: a pipe hosting opening of a determined radius and one notch along each side of each said pipe holding module, said notch located at the center of each said opening, and adjusting the height of said apparatus by removing one or more of said modules, placing the apparatus below a tube or pipe.

Other features and advantages of the present invention will become apparent upon examining the following detailed description of an embodiment thereof, taken in conjunction with the attached drawings, which are provided for purposes of illustration and not of limitation.

Figure 1:
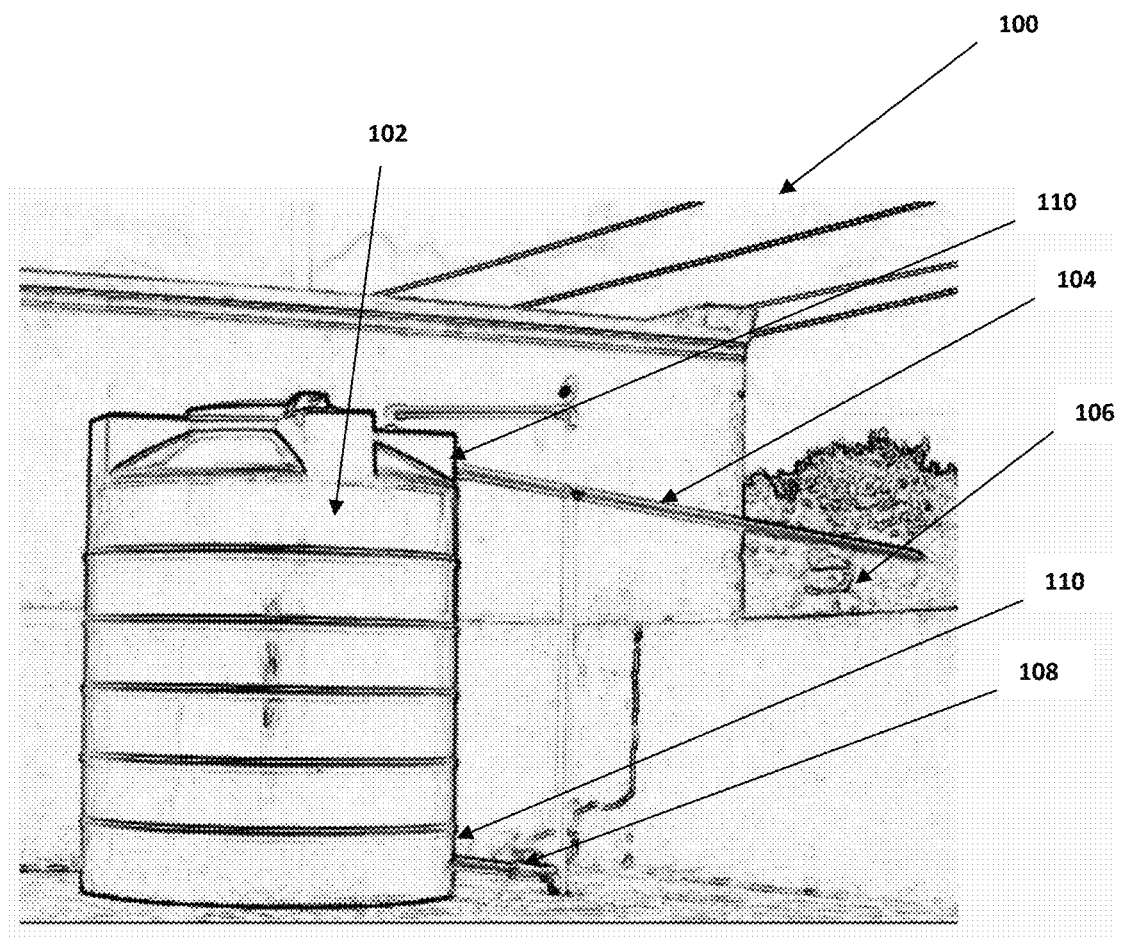
FIG. 1 shows a perspective of a plastic cistern installation, according to the prior art.
Figures 2, 3:
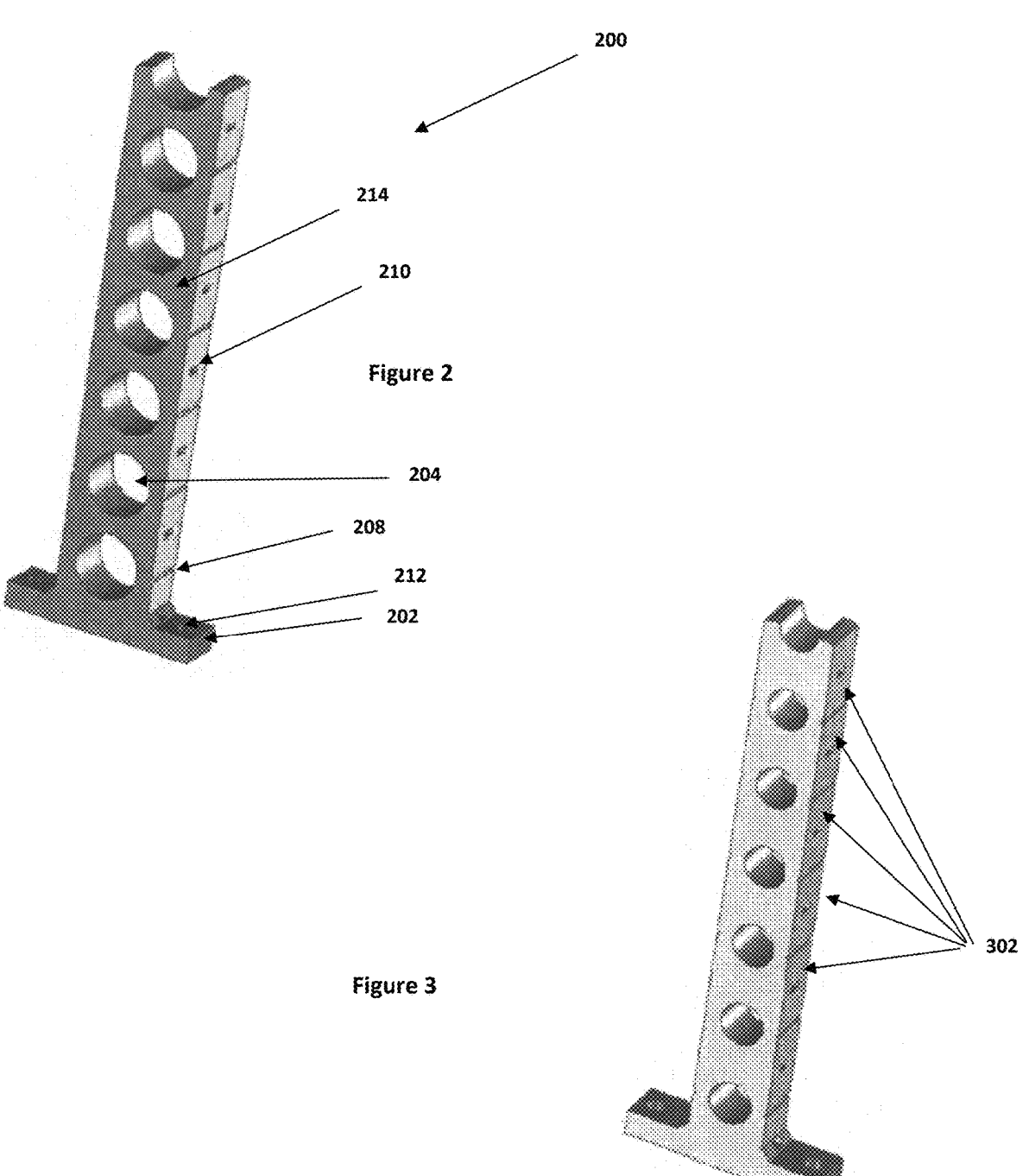
FIGS. 2-5 show various views of the proposed pipe support apparatus, according to exemplary embodiments of the invention.
Figures 4, 5:
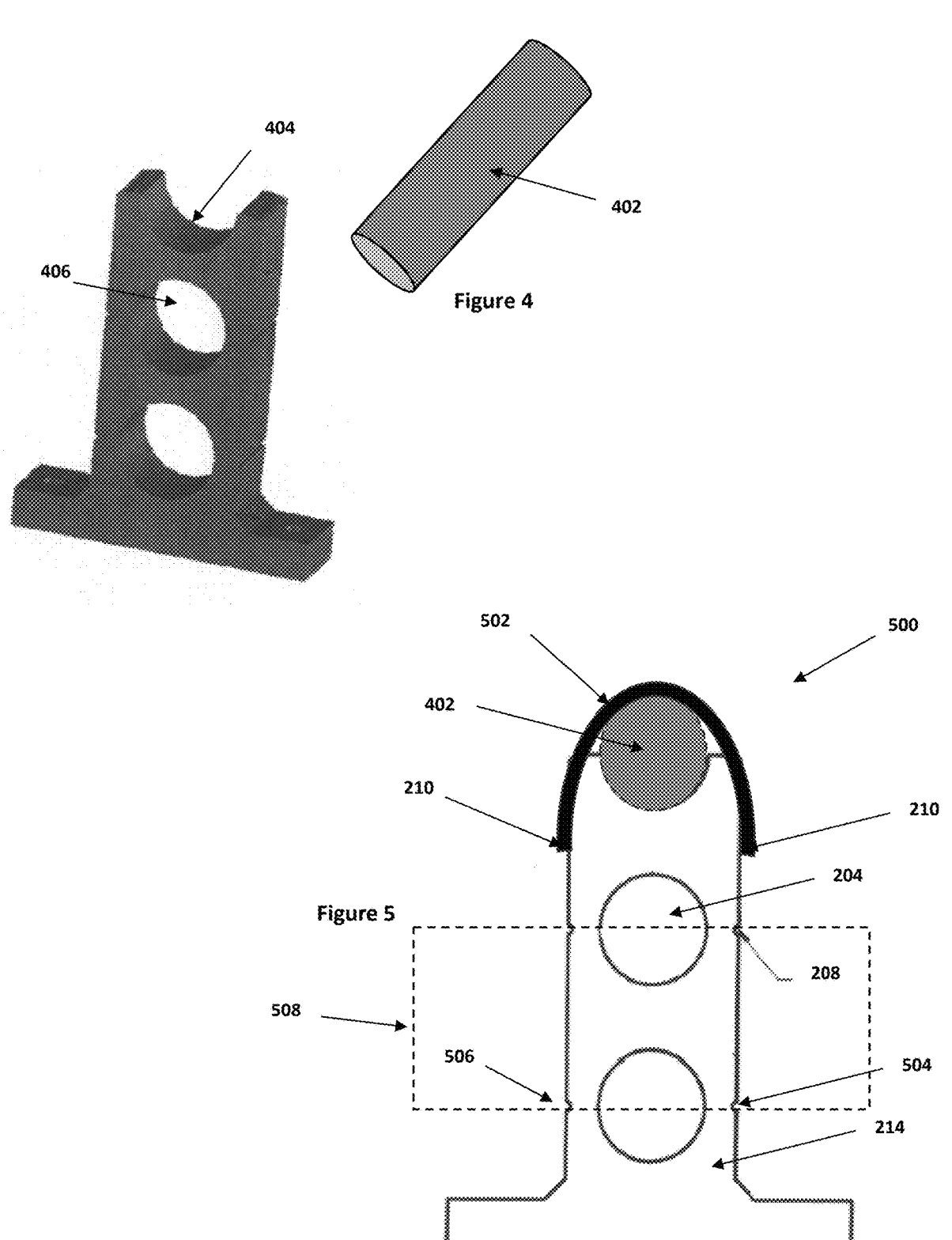

The above-described and other features will be appreciated and understood by those skilled in the art from the following detailed description and drawings.

DETAILED DESCRIPTION OF THE INVENTION

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

As mentioned before, the 'ad hoc' quality of rooftop cisterns/tanks 102 usually (FIG. 1 Prior Art) typically requires the adjustment/support of the various pipes 104, 108 connecting the unit to the various existing plumbing connections of the house. In many cases, it results in the 'temporary' pipe support 106. These, over time, may result in cracks around the parts 110 of the tank 102 supporting pipe.

One of the typical requirements of the proposed solution, is to fit a primarily 'as built' system, that is, one where factory determined requirements may require significant (i.e. expensive $$$) modifications to the home in which the tank is placed. The above drives the adaptability of the proposed solution.

The present invention, referring to FIGS. 2-5 illustrates various embodiments of the proposed solution to the problem of supporting the pipes 102/104 from a rooftop plastic cistern/tank 102. In one embodiment, this is accomplished through the ERY Tube Support 200 System and Method of use. The unit 200 is comprised of a vertical support column 214 having a base 202 for support.

The column 214 has one or more through pipe hosting openings 204 at varying heights from the base 202. In one embodiment the pipe hosting opening is circular, while in others it may be elliptical or even 'V' shaped, so as to provide the pipe with a surface in which to rest. Each through pipe hosting opening 204 forms a module 508, and each module is defined by an opening 204, and an upper and lower notch 208.

The openings 204 may be circular, oval, square, rectangular, angled squares or similar. The notches 208 are preferably located at a point that bisects the opening into two equal halves, so that the removal of the top module 508 results in an open cavity 404 into which the pipe or tube can be placed and hosted.

The unit 200 may be secured to another piece (or the ceiling) through mechanical components. In one embodiment, these are openings 212 formed so that a screw or nail can be attached to the roof surface or other mechanical support.

In one embodiment, at the middle of each opening 204, notches 208 are placed (on one or both sides), so that the user may remove all or portions of the top half of the module by simply knocking them off (forming either a U or a C shape). When such an action occurs, a strap 502 may be attached to the hooks, loops or other strap attachment points 210 on the side, so that 500 the pipe/tube 402 is secured to the unit 200. As shown 500, the strap 502 secures the pipe 402 to the half top opening 404 formed when the notch 208 is separated.

When we look at the assembly, in effect we have a unit 200 having a body with an elongated portion forming a column 214 with a base 202 at a distal end, wherein said base is slightly wider than said elongated portion (column 214), and said elongated portion is comprised of two or more pipe holding modules 216, each said pipe holding module comprising an opening 204 of a determined radius and one notch 208 along each side of each said pipe 504/506 holding module, said notch located at the center of each said opening. In this fashion, when the notch 504/506 is completely or partially broken, the resulting U or C shape will host the pipe or tube.

In defining the column 214, we speak of its height as the distance from base to top, of its front and back as the side of the columns that has the through openings 204, and of its sides as the side of the column that has the notches 208 and hooks/latches 210. We define a pipe holding module The unit 200 may be mfd. from a number of materials, including all or parts of metals, plastic (including injection molding and/or 3-D printing), wood, etc. In one example, the openings 206 may be sized for the traditional home pipes (¼", ½", ¾", 1", etc.).

In use, the installer calculates the height at which the pipe will be supported, and proceeds to remove the upper portions 302 from the unit 200, resulting on the open U 404 into which the pipe rests. If fine tuning is required, shimmies may be added to the bottom of the base 204. In an alternate embodiment, the pipe 402 is slid through the appropriate opening 406, leaving the complete opening to support the pipe.

CONCLUSION

In concluding the detailed description, it should be noted that it would be obvious to those skilled in the art that many variations and modifications can be made to the shown embodiments without substantially departing from the principles of the present invention. Also, such variations and modifications are intended to be included herein within the scope of the present invention as set forth in the disclosure.

It should be emphasized that the above-described embodiments of the present invention, particularly any "exemplary embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention.

The invention claimed is:

1. An adjustable height pipe support apparatus comprising:

a body having a base configured to rest on a support surface and a vertical column extending upwardly from the base;

wherein said base is slightly wider than said vertical column and said vertical column is comprised of a plurality of discrete, load-bearing pipe holding modules stacked in direct abutting contact, each said pipe holding module comprising:

a pipe hosting opening of a determined radius defining a support saddle for directly supporting a pipe; and a pair of opposed, open-sided notches positioned laterally outward of the pipe hosting opening;

wherein the notches of adjacent pipe holding modules are vertically aligned to permit manual removal of an entire pipe holding module as a unit, without breaking, fracturing, or deforming any portion of the pipe holding module;

wherein each pipe holding module is structurally complete and load-bearing prior to and after removal of an adjacent pipe holding module, and wherein no portion of any pipe holding module is sacrificial or intended to fracture to enable height adjustment;

such that a height of the vertical column is selectively reduced while remaining pipe holding modules continue to support the pipe.

2. The apparatus of claim 1 wherein:

each said opening is the same size; and said base has mechanical component attachment openings.

3. The apparatus of claim 2 wherein:

each said opening is the shape of one of:

circle, oval, rectangle, square.

4. The apparatus of claim 3 further comprising:

one hook or loop on each side of each said module.

5. An adjustable height pipe support system comprising:

a body having a base configured to rest on a support surface and a vertical column extending upwardly from the base;

wherein said base is slightly wider than said vertical column and said vertical column is comprised of a plurality of discrete, load-bearing pipe holding modules stacked in direct abutting contact, each said pipe holding module comprising:

a pipe hosting opening of a determined radius defining a support saddle for directly supporting a pipe; and a pair of opposed, open-sided notches positioned laterally outward of the pipe hosting opening;

wherein the notches of adjacent pipe holding modules are vertically aligned to permit manual removal of an entire pipe holding module as a unit, without breaking, fracturing, or deforming any portion of the pipe holding module;

wherein each pipe holding module is structurally complete and load-bearing prior to and after removal of an adjacent pipe holding module, and wherein no portion of any pipe holding module is sacrificial or intended to fracture to enable height adjustment;

such that a height of the vertical column is selectively reduced while remaining pipe holding modules continue to support the pipe; and a pipe supported by the support saddle of at least one pipe holding module.

6. The system of claim 5 wherein:

each said opening is the same size; and said base has mechanical component attachment openings.

7. The system of claim 6 wherein:

each said opening is the shape of one of:

circle, oval, rectangle, square.

8. The system of claim 7 further comprising:

one hook or loop on each side of each said module.

9. An adjustable height pipe support method comprising:

providing an apparatus with a body having a base configured to rest on a support surface and a vertical column extending upwardly from the base;

wherein said base is slightly wider than said vertical column and said vertical column is comprised of a plurality of discrete, load-bearing pipe holding modules stacked in direct abutting contact, each said pipe holding module comprising:

a pipe hosting opening of a determined radius defining a support saddle; and a pair of opposed, open-sided notches positioned laterally outward of the pipe hosting opening;

adjusting the height of said apparatus by removing one or more of said modules;

wherein removal comprises manually removing an entire pipe holding module as a unit, without breaking, fracturing, or deforming any portion of the pipe holding module;

placing the apparatus below a tube or pipe;

supporting the pipe-on-pipe hosting openings of remaining pipe holding modules while the height is adjusted.

10. The method of claim 9 wherein:

each said opening is the same size; and said base has mechanical component attachment openings.

11. The method of claim 10 wherein:

each said opening is the shape of one of:

circle, oval, rectangle, square.

12. The method of claim 11 further comprising:

one hook or loop on each side of each said module.

*    *    *    *    *